US009341510B2

(12) United States Patent
Goldberg et al.

(10) Patent No.: US 9,341,510 B2
(45) Date of Patent: *May 17, 2016

(54) CHAIR-BASED SCALE HAVING MULTIPLE CONFIGURATIONS AND SENSORS WITHIN CHAIR LEGS

(71) Applicants: Harvey Goldberg, Jerusalem (IL); Ki Kwan Chu, Hong kong (CN); Jason Goldberg, Toronto (CA)

(72) Inventors: Harvey Goldberg, Jerusalem (IL); Ki Kwan Chu, Hong kong (CN); Jason Goldberg, Toronto (CA)

(73) Assignee: Ideal Life, Inc., Ontario (CA)

( * ) Notice: Subject to any disclaimer, the term of this patent is extended or adjusted under 35 U.S.C. 154(b) by 67 days.

This patent is subject to a terminal disclaimer.

(21) Appl. No.: 13/683,153

(22) Filed: Nov. 21, 2012

(65) Prior Publication Data

US 2013/0319776 A1    Dec. 5, 2013

Related U.S. Application Data

(63) Continuation of application No. 12/710,120, filed on Feb. 22, 2010, now Pat. No. 8,344,272.

(60) Provisional application No. 61/154,273, filed on Feb. 20, 2009.

(51) Int. Cl.
*G01G 19/52* (2006.01)
*A47C 31/00* (2006.01)
(Continued)

(52) U.S. Cl.
CPC ............... *G01G 19/52* (2013.01); *A47C 4/283* (2013.01); *A47C 31/126* (2013.01); *G01G 19/44* (2013.01)

(58) Field of Classification Search
CPC ..... G01G 19/44; G01G 19/52; A47C 31/126; A47C 4/283
USPC ........................................................ 297/217.2
See application file for complete search history.

(56) References Cited

U.S. PATENT DOCUMENTS 51,091 A        11/1865  Shedd et al.
D149,161 S       4/1948  Bond, Jr.
(Continued)

FOREIGN PATENT DOCUMENTS

JP    11-056530         3/1999
JP    11-056530 A   *   3/1999   ............. G01G 19/52

OTHER PUBLICATIONS

Machine translation of JP 11-056530 A from the JP © website, Feb. 2012.*

*Primary Examiner* — Randy W Gibson
(74) *Attorney, Agent, or Firm* — Jon E. Gordon; Frommer Lawrence & Haug LLP

(57) ABSTRACT

A chair-based scale for weighing a person in a seated position is disclosed. The scale includes a system for electronically displaying data and other information. In one embodiment, the chair-based scale is a stand-alone scale, and in other embodiments, it communicates with a remote computer. According to one embodiment, the chair comprises a collapsible chair. A collapsible chair provides certain advantages, such as lower manufacturing and shipping costs, and ease of shipping to and storage and use at a user location (e.g., a patient's home or apartments), or a health care facility. According to an embodiment of the invention, the collapsible chair may be a folding chair, e.g., of the deck chair or director chair type. According to one embodiment, the chair comprises a protective cover that is movable to prevent loading of a load sensor in a non-weighing condition of the chair. In another embodiment, the chair is provided with wheels and e.g., is of the transport type.

9 Claims, 11 Drawing Sheets

(51) Int. Cl.
　　*G01G 19/44*　　(2006.01)
　　*A47C 31/12*　　(2006.01)
　　*A47C 4/28*　　(2006.01)

(56) References Cited

U.S. PATENT DOCUMENTS

| | | |
|---|---|---|
| 3,722,611 A | 3/1973 | Tirkkonen |
| 4,013,135 A | 3/1977 | Kechely |
| 4,047,427 A | 9/1977 | Young |
| 4,799,562 A | 1/1989 | Burrows et al. |
| 5,086,856 A | 2/1992 | Haggstrom |
| 5,511,571 A | 4/1996 | Adrezin et al. |
| 5,747,745 A | 5/1998 | Neuman |
| 5,831,221 A | 11/1998 | Geringer et al. |
| 5,861,582 A | 1/1999 | Flanagan et al. |
| 6,225,575 B1 | 5/2001 | Hoyland |
| 6,403,897 B1 | 6/2002 | Bluth et al. |
| 6,590,166 B2 | 7/2003 | Yoshida |
| 6,639,157 B2 | 10/2003 | Sternberg et al. |
| 6,825,425 B2 | 11/2004 | Perry |
| 6,875,932 B2 | 4/2005 | Tuft |
| 8,344,272 B1 * | 1/2013 | Goldberg et al. ............. 177/126 |
| 2005/0099041 A1 | 5/2005 | Becker et al. |
| 2005/0178590 A1 | 8/2005 | Martin-Woodin et al. |
| 2006/0103192 A1 | 5/2006 | Norton |
| 2008/0035391 A1 | 2/2008 | Jewett et al. |
| 2010/0207434 A1 | 8/2010 | Kurrasch et al. |

* cited by examiner

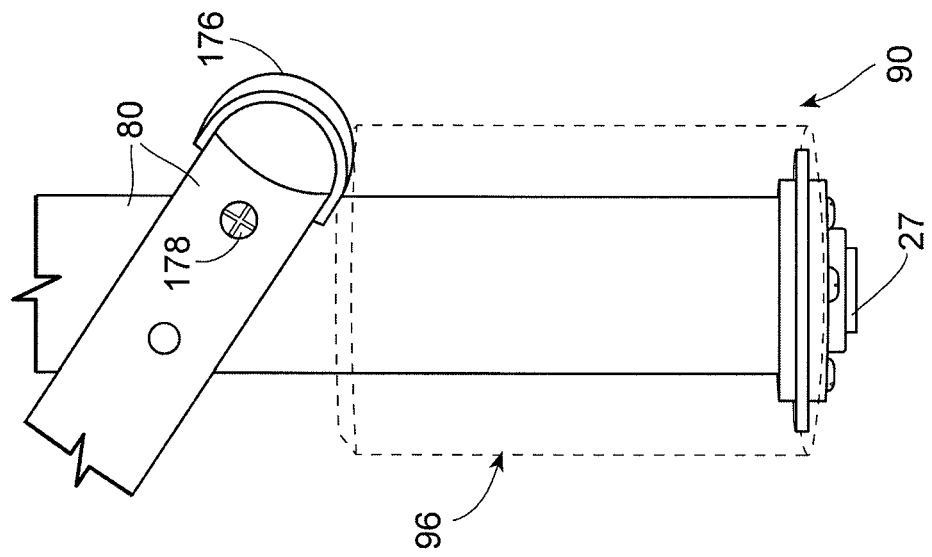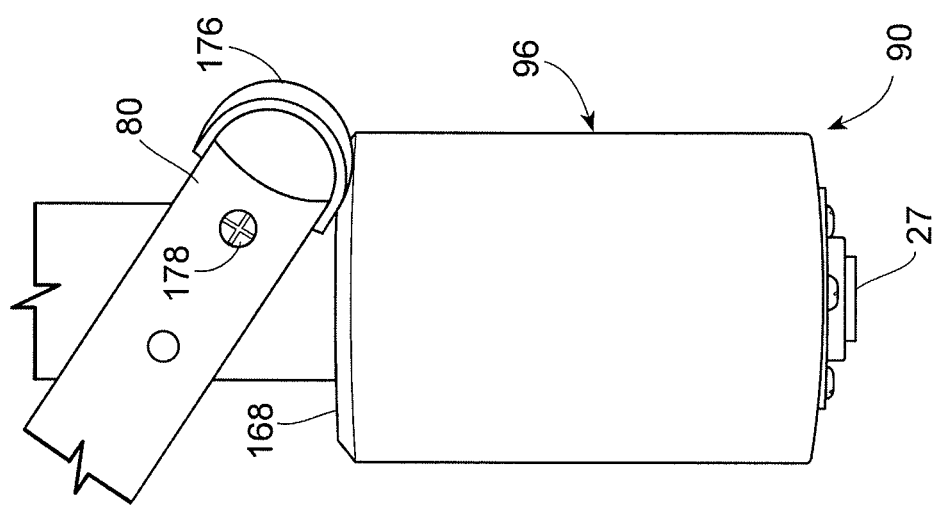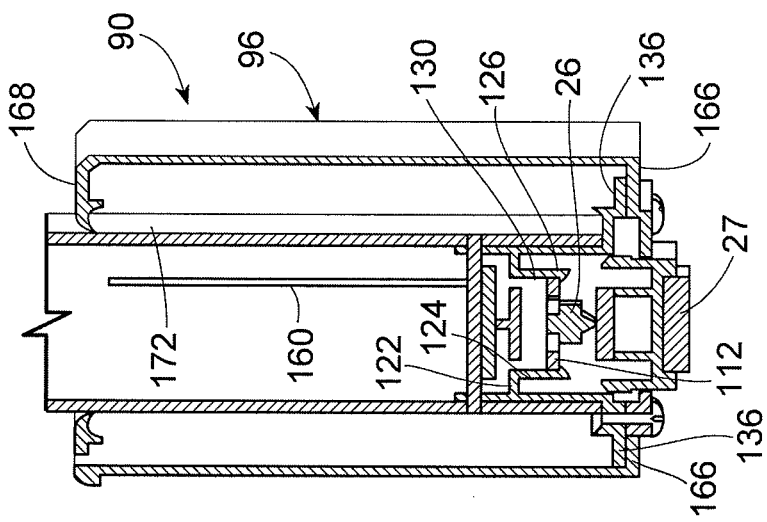

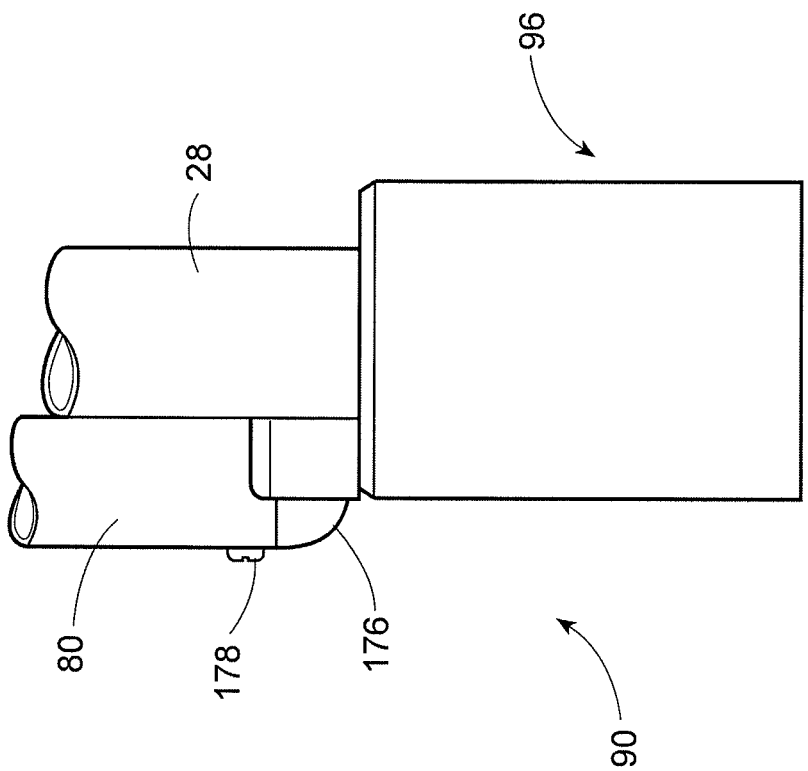
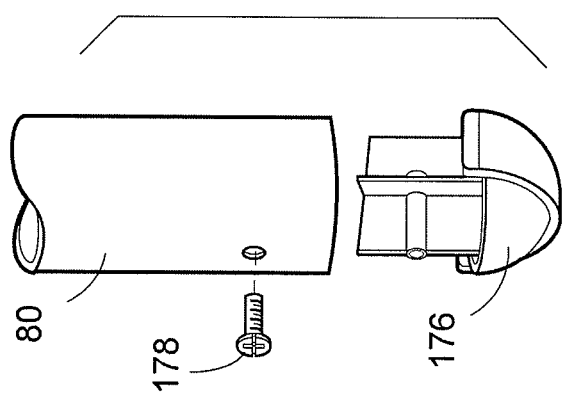

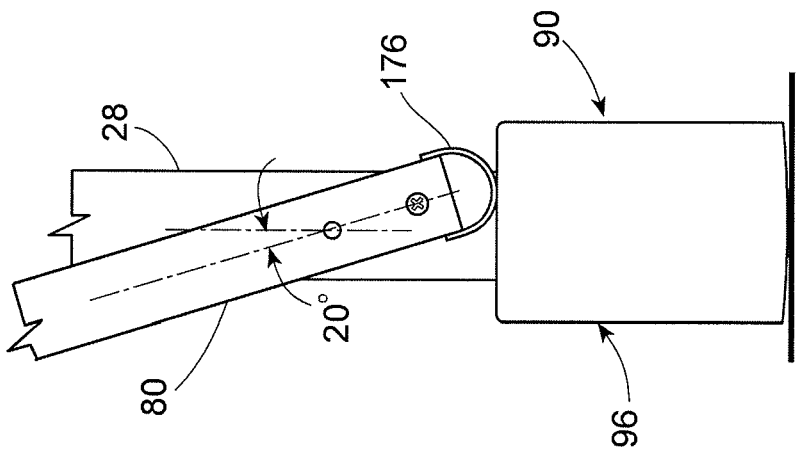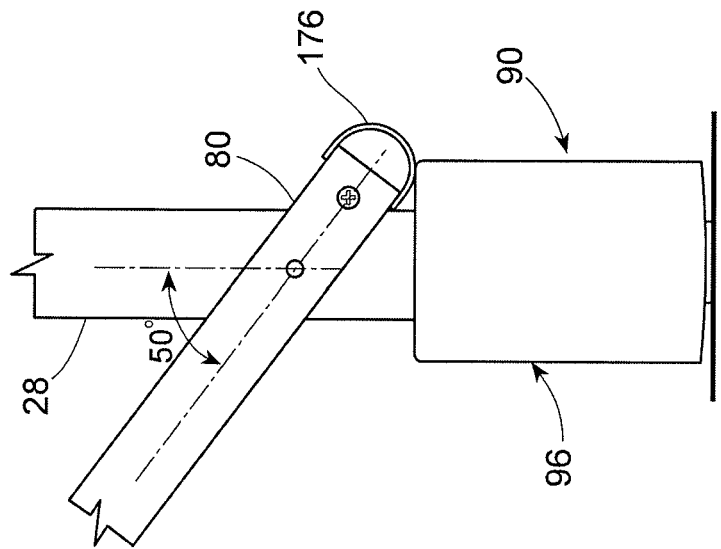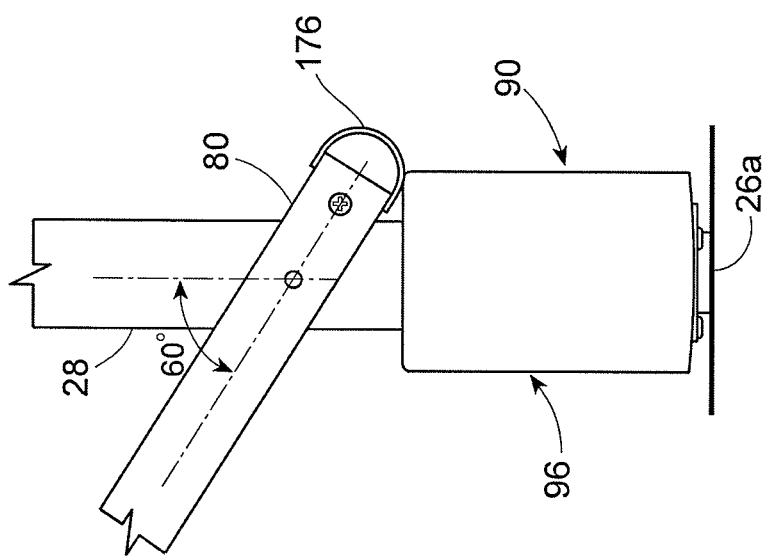

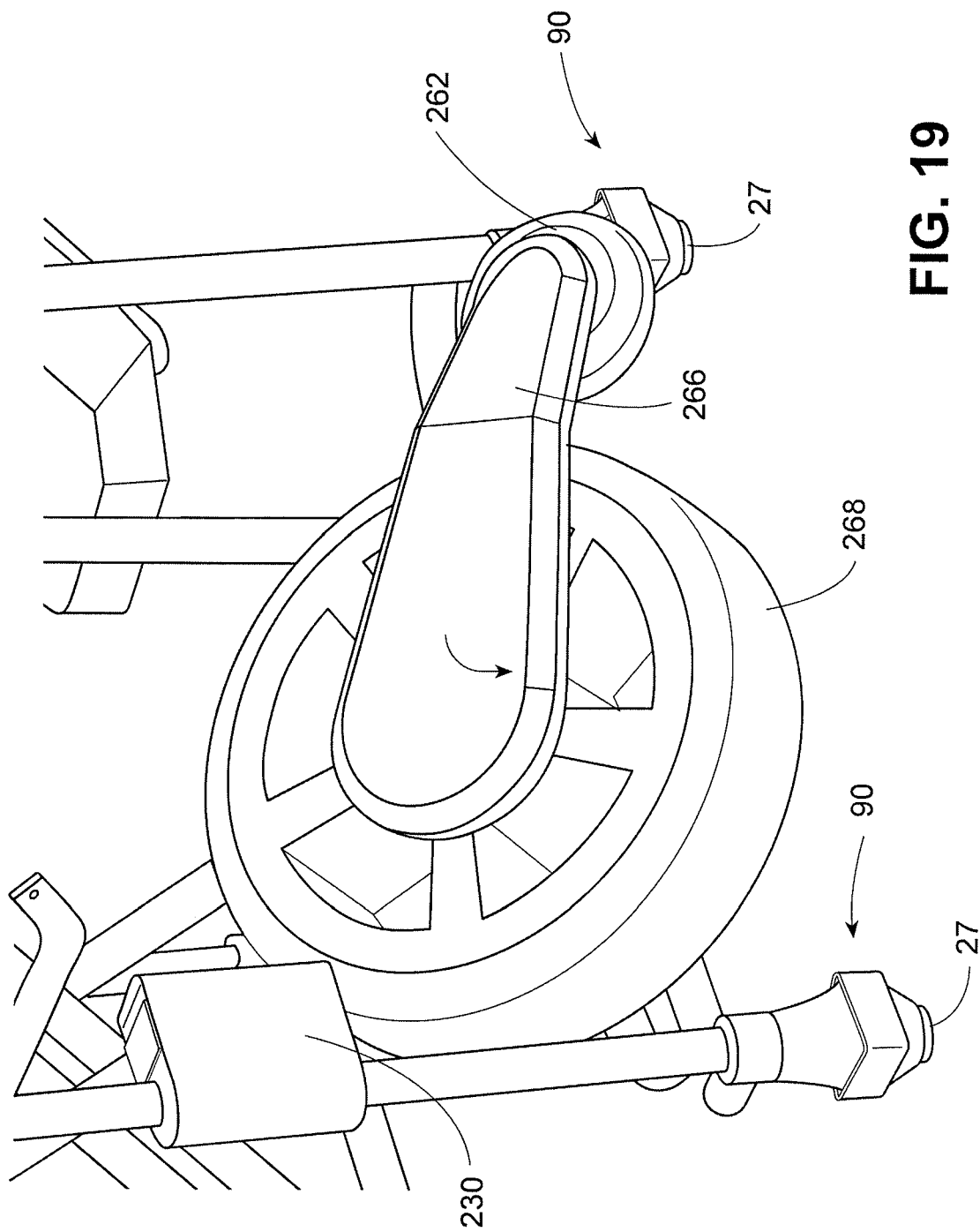

CHAIR-BASED SCALE HAVING MULTIPLE CONFIGURATIONS AND SENSORS WITHIN CHAIR LEGS

RELATED APPLICATIONS

This application is a continuation of nonprovisional patent application Ser. No. 12/710,120, filed Feb. 22, 2010, titled "Chair-Based Scale" This application and Ser. No. 12/710,120 claim the benefit of provisional patent Application No. 61/154,273, filed Feb. 20, 2009, titled "Chair-Based Scale." The entire disclosures of Ser. No. 12/710,120 and 61/154,273 are incorporated herein by reference.

Subject matter disclosed in any or all of the following patent and patent applications may be disclosed herein: U.S. Pat. No. 6,840,904; application Ser. No. 10/868,676 filed Jan. 15, 2004; Ser. No. 10/963,205 filed Oct. 11, 2004; Ser. No. 10/913,140 filed Aug. 6, 2004; Ser. No. 11/108,355 filed Apr. 18, 2005; Ser. No. 11/356,739 filed Feb. 16, 2006; and Ser. No. 12/509,119 filed Jul. 24, 2009 (each "a cited application" and collectively "the cited applications"). The disclosures of all of these applications are incorporated herein by reference except for subject matter that is substantively incompatible with the disclosure of this application. In addition, terms may be used differently herein, or encompass different things as used herein, than in the cited applications, and this application should not be used to interpret terms in the cited applications and vice versa.

BACKGROUND OF THE INVENTION

The invention disclosed herein relates to a chair-based scale that weighs a person supported by a chair. Disclosed embodiments include chairs which are foldable or otherwise collapsible, and chairs which have wheels, e.g., wheelchairs, transport chairs, etc.

SUMMARY OF THE INVENTION

According to embodiments of the invention, a chair is configured to suitably support and weigh an occupant supported by the chair, e.g., in a seated position. For example, embodiments of the chair may include one or more foot rests, one or more arm rests and/or a seat back.

According to some embodiments of the invention, a scale comprises a chair, and an electronic scale comprising one or more load sensors attached to receive loading otherwise received, directly or indirectly, by one or more feet or legs of the chair. In some embodiments, a load sensor is mounted to a chair leg so as to be loaded by a member, e.g., a load transmitting member, which contacts a supporting surface such as a floor, at least in a weighing condition of the chair, and transmits loading to the load sensor. In some embodiments, the member is movably mounted relative to the chair leg. In some embodiments, the load sensor directly contacts the supporting surface.

According to some embodiments, the chair-based scale comprises a mounting arrangement for a load sensor that attaches to a leg of the chair, which in a weighing configuration of the chair exposes a load transmitting member or the load sensor to contact the supporting surface, and in a non-weighing configuration of the chair prevents the load transmitting member or the sensor from contacting the supporting member. In some embodiments, the mounting arrangement comprises a cover that moves between a projecting position in the non-weighing condition of the chair and a non-projecting (or retracted) position in the weighing condition of the chair. For example, the cover may comprise a sleeve mounted in a telescoping fashion to the chair leg movable to project beyond the end of the chair leg in the non-weighing condition of the chair.

In accordance with an embodiment of the invention, a load sensor is attached to a chair leg at the lower end thereof by a mounting arrangement. Without the mounting arrangement, the leg would otherwise fully contact a supporting surface for the chair. The mounting arrangement, however, at least partially contacts the supporting surface, at least in the non-weighing condition of the chair, and prevents loading of the load sensor. In the weighing condition of the chair, the mounting arrangement allows the load sensor to be loaded.

According to an embodiment of the invention, the mounting arrangement comprises a movably mounted protective cover that prevents loading of the load sensor, e.g., by projecting beyond the end of the leg in the non-weighing condition of the chair, and retracts to permit loading of the load sensor from the supporting surface in the weighing condition of the chair. According to an embodiment of the invention, the mounting arrangement includes the load transmitting member mentioned above, and projects beyond the load transmitting member in the non-weighing condition of the chair and retracts to expose the load transmitting member in the weighing condition of the chair.

According to an embodiment of the invention, the scale comprises a mechanism which moves the protective cover between projecting and retracted positions. According to an embodiment of the invention, the protective cover comprises a hollow member such as a sleeve that moves in telescopic fashion with respect to the end of the leg to shield and expose the load transmitting member (or load sensor) when the protective cover is moved between the projecting and retracted positions, respectively. According to an embodiment of the invention, the protective cover is constructed to contact the supporting surface in the projecting position thereof and provide support for the leg of the chair to which it is attached. Thereby, the chair is at least partially supported by the protective cover.

According to an embodiment of the invention, a load sensor is attached to each leg of the chair.

In accordance with an embodiment of the invention, the chair comprises a collapsible chair. A collapsible chair provides certain advantages, such as lower manufacturing and shipping costs, and ease of shipping to and storage and use at a user location (e.g., a patient's home or apartments), or a health care facility. According to an embodiment of the invention, the collapsible chair may be a folding chair, e.g., of the deck chair or director chair type, or other type of collapsible or folding chair. (As used herein, the forms of term "collapsible" encompass forms of the term "folding.")

According to an embodiment of a scale that comprises a protective cover mounted as described above to a collapsible chair, the protective cover in the projecting position thereof in a collapsed condition of the chair prevents loading of the load sensor, and need not provide a supporting function in the collapsed (or folded) condition of the chair. According to an embodiment of the invention, the protective cover is mounted to the leg biased to the projecting position, and movable against the bias to the retracted position. According to an embodiment comprising a collapsible chair, the collapsing action of the chair in accordance with an embodiment of the invention may be used to automatically move the protective cover into the retracted position when the chair is erected (or unfolded) for use. In accordance with this embodiment, the protective cover may be biased towards the projecting position and moved against the bias to the retracted position in response to erecting (or unfolding) of the chair. In accordance with an embodiment of the invention, a spring provides the bias. Alternatively, a separate manually operated lever or other mechanism may be provided to move the cover.

According to some embodiments, the chair is provide with a wheel or wheels and usable, e.g., as wheelchair or transporter chair. Such embodiments facilitate movement of the chair, e.g., to bedside or to a patient's location, etc., and can be used to transport patients. These embodiments combine the convenience of a rolling chair and a scale.

According to some embodiments of a rolling chair, the wheel or wheels are stowable so that the chair can be converted between a rolling chair supported or partially supported by at least one wheel and a stationary chair supported by the chair legs. In these embodiments, sensors can be mounted to a leg or legs as described above and the stationary chair can function as a scale as described above.

In embodiments in which the chair comprises one or more wheels, sensors can be mounted to a leg or leg so as to be loaded by a respective wheel rather that a supporting surface for the chair.

In accordance with an embodiment of the invention, the scale comprises processing circuitry that processes the output(s) of the sensor(s). In accordance with embodiments of the invention, the processing circuitry can provide output usable for, e.g.: local and/or remote display, local and/or remote processing, local and/or remote storage, and for other uses and purposes. In one embodiment, the scale includes at least one display device which receives and displays output from the processing circuitry, e.g., weight values. According to some embodiments, a module including a display device is attached to the chair, and in some embodiments, a portable display device module is provided (which may also be removably attached to the chair). In some embodiments, a display device is provided attached to the chair and a portable display device is also provided. In some embodiments, at least one input device and at least one communications device are associated with the display device module and/or the portable display device for providing information and receiving information to/from the processing circuitry and/or to/from a remote computer over a network.

According to some embodiments, some electronic components are attached to a chair leg or a lower portion of the chair and a display device or portable display device or control module or other electronic components are attached to an arm or the upper part of the chair. In one such embodiment, wireless communication is provided at least from components mounted to a lower part of the chair and components mounted to an upper part of the chair or portably mounted components.

According to an embodiment of the invention, a scale comprises: a chair which comprises a plurality of legs; a load sensor attached to at least one leg positioned to be loaded, directly or indirectly, from a supporting surface in a weighing condition of the chair; and a protective cover mounted to the at least one leg movable between a projecting position extending from the at least one leg to prevent loading of the sensor in a non-weighing condition of the chair and a retracted position permitting loading of the sensor by the supporting surface in the weighing condition of the chair.

According to an embodiment, the scale comprises a collapsible chair, wherein the protective cover is movable to the projecting position in a collapsed, non-weighing condition of the chair and movable to the refracted position in an erected, weighing condition of the chair.

According to an embodiment, the scale comprises means, e.g., a spring or springs, for biasing the protective cover to the projecting position.

According to an embodiment, the chair-based scale comprises means for moving the protective cover between the projecting and retracted positions in response to action of the chair in collapsing and erecting the chair.

According to an embodiment, the chair-based scale comprises means for moving the protective cover against the bias to the retracted position in response to action of the chair in erecting the chair from the collapsed condition thereof.

Such means for moving the cover may include one or more pivotable or otherwise movable members that move in response to collapsing and erecting the chair. For example, such movement may be automatic so as to automatically project and retract the cover.

The invention is described below in more detail with reference to the drawings.

BRIEF DESCRIPTION OF THE DRAWINGS

The following detailed description, given by way of example and not intended to limit the invention to the disclosed details, is made in conjunction with the accompanying drawings, in which like references denote like or similar elements and parts, and in which:

FIGS. 1 and 1A are front perspective views of a chair-based weighing system according to one embodiment of the invention which includes a foldable chair shown in its unfolded, weighing condition;

FIG. 7 is a sectional view of the leg end depicted in FIG. 4;

FIGS. 8 and 9 are enlarged views of the leg end depicted in FIG. 4 in the unfolded, weighing condition of the chair showing a camming mechanism which moves a hollow protective cover for the load sensor between a retracted position, shown in FIGS. 8 and 9 (the cover is shown transparent in FIG. 9), and a projecting position, shown in FIG. 12;

FIG. 11 is a perspective view of an end of a pivoting cross member of a scissors linkage of the chair showing a cam element detached from the end of the cross member;

FIG. 12 a side elevation view of the leg end depicted in FIG. 4 showing the cam attached to the end of the cross member contacting the protective cover in the folded, non-weighing condition of the chair;

FIGS. 13-15 are side views of the leg end depicted in FIG. 12 illustrating a sequence in which the chair is moved from its unfolded, weighing condition to its folded, non-weighing condition;

FIG. 19 is a perspective view showing a wheel of the chair depicted in FIG. 17 in its fully stowed position.

DETAILED DESCRIPTION OF PREFERRED EMBODIMENTS

Embodiments of the invention are described below with reference to the accompanying drawings. However, it is to be understood that the invention is not limited to such embodiments and the details thereof, which are provided for purposes of illustration and not limitation.

Figure 1:
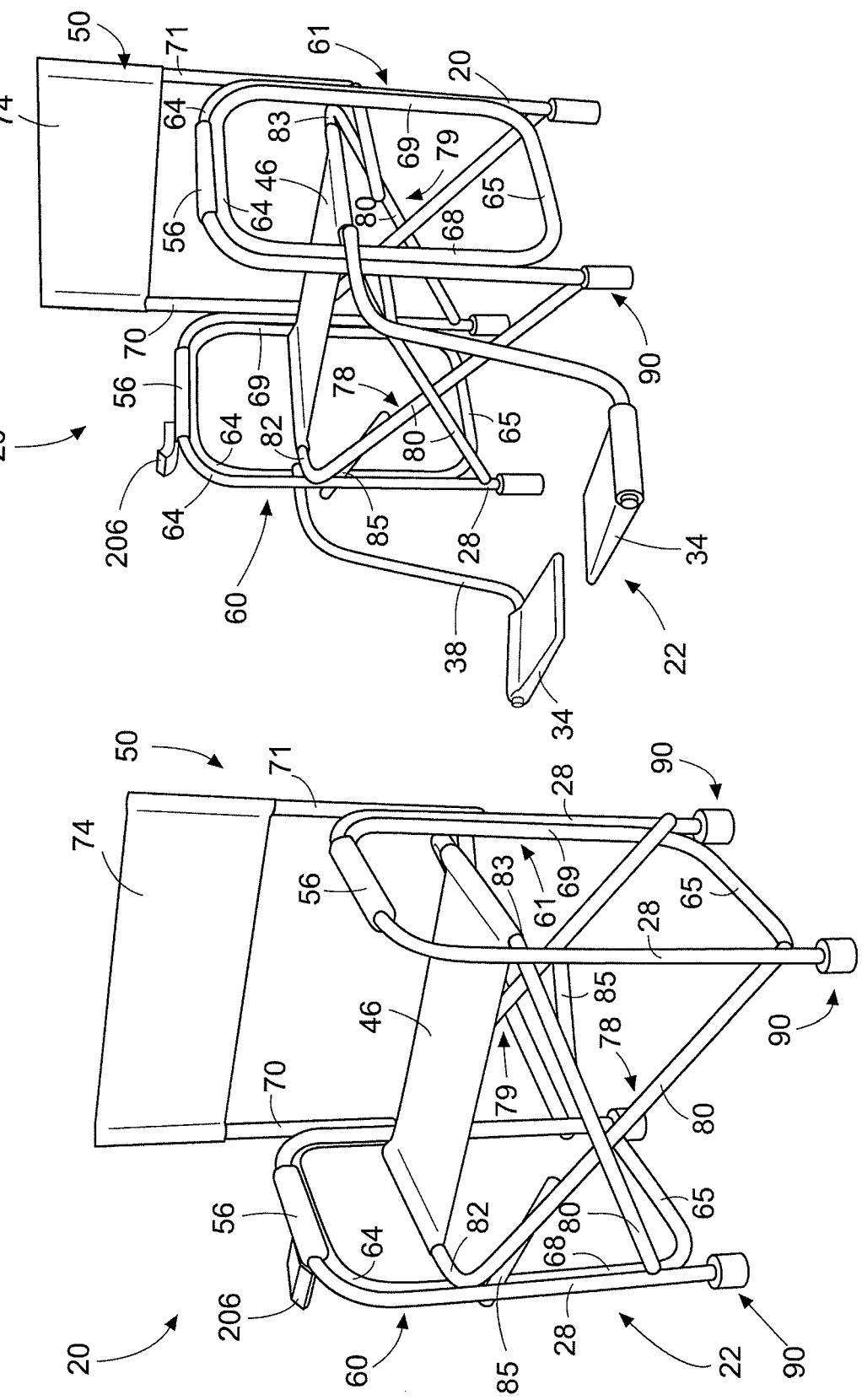
Figure 2:
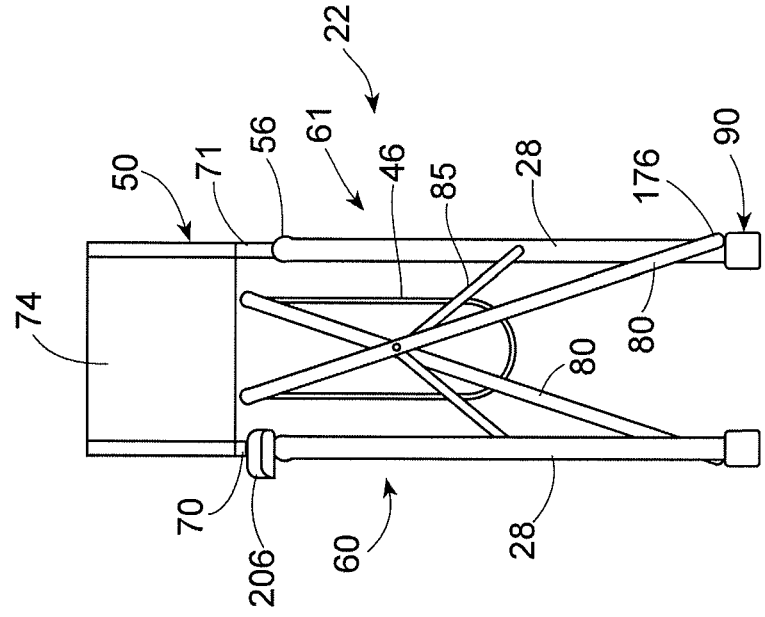
FIG. 2 is a front elevation view of the chair depicted in FIG. 1.

Referring to FIGS. 1, 1A, 2, a chair-based scale 20 according to an embodiment of the invention comprises a chair 22 and an electronic scale system 24 (FIG. 16) incorporated therein. The electronic scale system comprises a plurality of load sensors 26. In the embodiment illustrated in the drawings, a load sensor 26 is provided for each leg 28 of the chair 22. However, an electronic scale system and a chair configuration may be provided that operates with less than a load sensor for each chair leg.

The chair 22 (FIGS. 1, 1A, 2) includes one or more supports (FIG. 1A) for the feet of a person seated or otherwise supported by the chair 22. In the embodiment depicted in FIG. 1A, the chair 22 includes two individual foot rests 34, one for each foot. However, other embodiments may include a single foot rest that accommodates two feet, or a foot support or supports in the form of a stirrup or stirrups, or any suitable foot support such that the chair and the foot support(s) support a chair occupant suitably to be weighed by the electronic scale system 24. In the embodiment depicted in FIG. 1A, the foot rests 34 are attached to arms 38 which are attached to the frame members 60 and 61 which define a frame of the chair, but the foot rests 34 may be attached or otherwise supported in any suitable fashion. In the embodiment depicted in FIG. 1A, the foot rests are pivotally attached to the arms 38, but need not be. However, pivotally mounting the foot rests, e.g., for pivoting vertically about a horizontal axis, contributes to the collapsibility of a collapsible chair provided in accordance with an embodiment of the invention described below. In the embodiment depicted in FIG. 1A, the arms 38 are fixed to the frame members 60 and 61, but may be pivotally attached thereto by any suitable pivot joint.

The chair 22 (FIGS. 1, 1A, 2) includes the frame to which are attached the legs 28, a seat 46, and a seatback 50. (However, a backless chair or stool may be provided.) The chair 22 also includes arm rests 56, which in the embodiment depicted in FIGS. 1, 1A, are defined by the configuration of the frame and comprise a suitable cover positioned over the top of the frame members 60 and 61. The chair components depicted in FIGS. 1, 1A, 2 are exemplary, and these and other components may be configured in any suitable manner. Further details of the construction of the embodiment of the chair 22 depicted in FIGS. 1, 1A, 2 are described below. However, it is to be understood that the invention should not be limited to details shown and/or described in connection with the specific embodiment illustrated in FIGS. 1, 1A, 2.

The chair embodiment illustrated in FIGS. 1, 1A, 2 is that of a collapsible chair 22, and the specific embodiment depicted resembles a foldable wheelchair or transport chair, or a deck chair (with front and rear scissors or x-joints). These types of folding chairs are known in the art. However, other suitable collapsible or folding chairs or stools may be used, e.g., various types of deck chairs, director's chairs and stools. As discussed above, a collapsible chair provides certain advantages.

In the embodiment depicted in FIGS. 1, 1A, 2, the frame of the chair comprises left and right frame members 60 and 61. A leg 28 is attached to the front and rear of each frame member 60, 61, and an arm rest cover 56 is attached to the top of each frame member 60, 61. Each frame member 60, 61 comprises a tubular or bar-like structure extending to form a closed loop which includes opposed upper 64 and lower 65 horizontal sections and opposed front 68 and back 69 vertical sections. Configurations of the frame members 60 and 61 other than tubular or bar-like may be used. Each leg 28 extends along a respective vertical section 68 or 69 and is attached thereto as well as to a respective horizontal section 64 at the top of the respective leg.

As mentioned, the chair 22 includes a seatback 50, which comprises left 70 and right 71 vertical support members which each extend vertically above the seat 46 and also partially along a rear leg 28 to which the respective seatback support member 70, 71 is attached. A collapsible or sling-type back support 74 is attached to and extends between the vertical support members 70, 71. In the illustrated embodiment, the collapsible back support comprises flexible material such as a natural or synthetic textile, natural or synthetic leather or a film, etc.

The frame members 60, 61 (FIGS. 1, 1A, 2) may comprise a one-piece construction shaped or bent to form the closed loop, or sections joined together in a telescoping fashion or using any suitable attachment system. In the chair 22 illustrated in FIGS. 1, 1A, 2, the frame members 60, 61 comprise attached sections. The frame members 60, 61 and the legs 28 are made of suitable metal tubing in the embodiment depicted in FIGS. 1, 1A, 2.

The side frames 60, 61 (FIGS. 1, 1A, 2) are interconnected by front 78 and rear 79 scissors or x-pivot supports which comprise cross members 80 attached at opposite ends thereof to side frame members 60, 61, e.g., by pivot joints, and pivoted together between the ends, e.g., midway. The front and rear scissors supports 78, 79 are interconnected by horizontal seat support members 82, 83 which are attached to respective frame members 60 and 61. A strut member 85 is pivotally connected to each leg and to each scissors cross member 80. The seat 46 is collapsible or of the sling-type and is attached to and extends between the horizontal seat support members 82, 83. In the illustrated embodiment, the collapsible seat comprises flexible material such as a natural or synthetic textile, natural or synthetic leather or a film, etc., as described above for the seatback 74.

Figure 3:
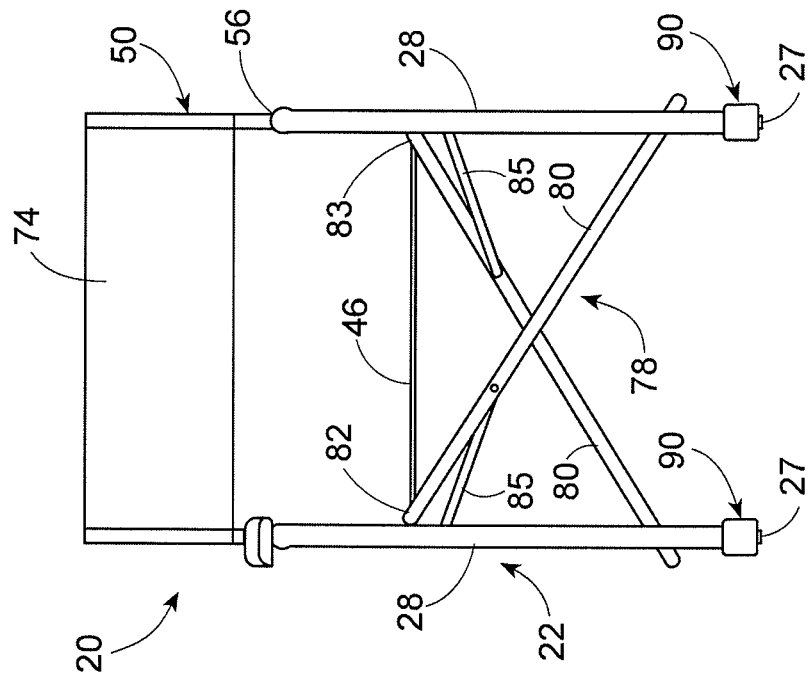
FIG. 3 is a front elevation view showing the chair depicted in FIG. 1 in its collapsed, non-weighing condition.

The chair 22 may be folded (or collapsed) from the an unfolded (or erected), weighing condition depicted in FIGS. 1, 1A, 2 to the collapsed, non-weighing condition depicted in FIG. 3, and expanded from the collapsed condition depicted in FIG. 3 to the erected condition depicted in FIGS. 1, 1A, 2 similar to the manner in which a folding wheelchair is folded and unfolded.

The chair elements described above may comprise any suitable material and configuration. For example, the support elements may be tubular and fabricated from materials with appropriate durability and weight such as high strength-to-weight ratio metals or alloys, or plastics with or without reinforcing fillers or additives, such as glass fibers. In cross section, the support elements may have any shape or dimension found suitable for the anticipated use of the chair-based scale, such as, but not limited to, round, oval, or rectangular. In the embodiment depicted in FIGS. 1, 1A, 2, the frame, legs 28, arms 38, scissors cross members 80, struts 85 and seatback supports 70, 71 are constructed from suitable metal tubing.

Figure 4:
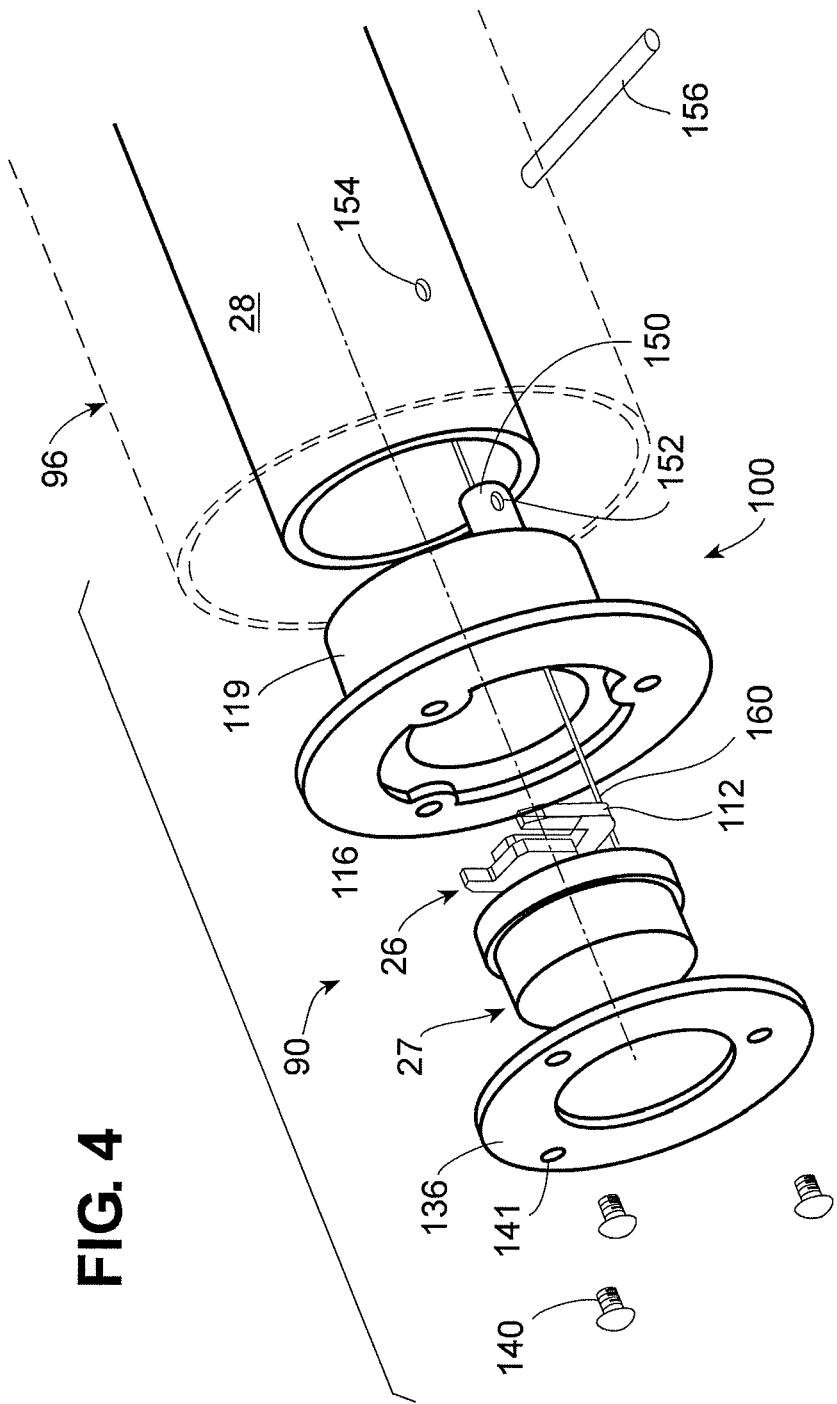
FIG. 4 is an exploded perspective view of an end of one leg of the chair depicted in FIG. 1 showing mounting of a load sensor to the leg end.

According to one embodiment, the chair-based weighing system 20 includes four load sensors 26, one for each leg. Each load sensor 26 is mounted in an assembly 90 which is attached to the lower end of a respective leg 28. The assembly 90 extending from each leg 28 is covered by a movable protective cover 96 (shown transparent in FIGS. 4 and 9). In an exemplary, non-limiting embodiment, the scissors supports 78, 79 move the protective covers 96 between a retracted position (FIG. 13) and a projecting position (FIG. 15) automatically with collapsing and erecting of the chair 22.

The load sensor 26 (FIGS. 4-6) is, e.g., of the strain type (but may be any suitable load sensor) and is retained in a sensor assembly 90 (FIG. 4) so as to be loaded by a load transmitting member or plunger 27 that contacts the supporting surface (see FIG. 2). The sensor assembly 90 is mounted to a chair leg 28. In the embodiment depicted in FIGS. 1, 1A, 2, the plunger 27 (shown in FIG. 2) fully supports the leg to which the load sensor assembly 90 is attached in the weighing condition of the chair on the supporting surface.

Load sensor 26 (FIGS. 5-6) comprises spaced support arms 112 and a central arm 114 which are attached at 115. The central arm 114 is configured to provide a space between the central arm 114 and the support arms 112, as shown in FIG. 6. The plunger 27 is mounted to contact the central arm 114 (FIG. 7). Loading applied by the plunger 27 to the arm 114 flexes the arm, and such flexing is proportioned to loading (and weight). The operation of load sensors is well known in the art and therefore further description is not being provided herein.

A load sensor 26 is mounted in a sensor assembly 90 as follows. The sensor assembly 90 (FIGS. 4 and 7) comprises a flanged retainer 100 which receives and retains therein load sensor 26a. The flanged retainer 100 comprises a tubular section 119 and a flange section 120. Snap-fit structure in the interior of the tubular section 119 of flanged retainer 100 holds the arms 112 of sensor 26 therein. The snap-fit structure comprises an annular shoulder 122 (FIG. 7) in the interior of tubular section 119 from which flexible arms 124 depend. The arms 124 are spaced to receive therebetween the support arms 112. Tabs 126 at the ends of arms 124 function as lugs to retain the support arms 112 of the sensor 26. The inner edges of the tabs 126 are beveled to form camming surfaces to flex the arms 124 apart as the sensor support arms 112 are inserted therebetween. A stop for the snap fit comprises another shoulder 130 in the interior of the tubular section 119 spaced from the tabs 126 to accommodate and retain the sensor support arms 112 therebetween. The sensor 26 is mounted with the sensor central arm 114 spaced downwardly from the sensor support arms 112.

The outer diameter of the plunger 27 (FIG. 4) is slightly smaller than the inner diameter of the tubular section 119 so that the plunger 27 is slidably received in the tubular section 119. The sensor assembly also includes a ring 136 having an inner diameter that is less than the outer diameter of the plunger 27 so that coaxial mounted of the ring 136 to the flanged retainer 100 retains the sensor plunger 27 in the tubular section 119 of the flanged retainer 100. The ring 136 is mounted coaxially onto to the retainer 100 by screws 140 passing through holes 141 in the ring and threaded to tapped holes 142 on the inner periphery of the flange section 120 of the flanged retainer 100.

The tubular section 119 (FIG. 4) of the flanged retainer 100 includes ears 150 (FIG. 4) positioned diametrically opposed at the top of the tubular section 120. Holes 152 are provided in the ears 150 and diametrically positioned holes 154 are provided in each leg 28. The tubular section 119 of the retainer 100 is positioned in the interior of a chair leg 28 with the holes 152 and 154 aligned, and with the flange section 120 abutting the bottom end of the leg. A pin 156 inserted through a leg 28 through the aligned holes 152 and 154 fixes the flanged retainer 100 to a leg 28.

Plunger 27 is mounted to the sensor assembly 90 so as to be movable towards the sensor 26 which is retained within the flanged retainer 100 by the snap-fit arrangement described above. The distance between the sensor elements 116 and 118 is proportional to loading on the chair 22 in the weighing condition of the chair, as mentioned above.

As shown in FIGS. 7-9 and 13 (the weighing condition of the chair), the plunger 27 projects beyond the protective cover 96 and contacts a supporting surface such as a floor. When the chair is loaded, e.g., from a chair occupant's weight, the plunger 27 is forced by contact with the supporting surface towards the sensor 26 under the weight of the occupant introduced to the chair, and the sensor 26 outputs a voltage change via wires 160 proportional to weight.

In the weighing condition of the chair 22, the protective cover 96 is retracted, as depicted in FIGS. 7-10 and 13. As shown in FIG. 7, the protective cover comprises an inwardly projecting circumferential lip 166 at the bottom thereof that engages the ring 136 in the mounted condition of the sensor assembly 90. The sensor assembly 90 also includes a ring 168 (FIG. 10) that is attached to the top of the protective cover 96 by a snap fit arrangement comprising tabs 170 projecting from the top of the protective cover 96 and slots 172 in the ring 168. The inner diameter of the ring 168 is sized to receive therein a leg 28 of the chair. A coil spring 172 is mounted around the leg 28 in the interior of the protective cover retained by the lip 166 and the ring 168. The coil spring 172 biases the protective cover 96 upwardly to engage the lip 166 with the ring 106 of the flanged tubular member 100. This is the weighing condition of the chair where the load sensor 26 is not covered by the protective cover 96. The protective cover 96 may be moved downwardly beyond the lip 166 to cover the plunger 27 by overcoming the spring tension of the coil spring 172. This is the non-weighing condition of the chair.

The action of scissors supports 78 and 79 (FIG. 1A) moves the protective cover 96 of each sensor assembly against the bias of spring 172 when the chair is folded (collapsed) to cover the respective plungers 27. The cross member 80 of each scissors support 78, 79 has mounted to the lower end thereof a push element 176 that contacts the top of a respective protective cover 96 to push it against the bias of the respective coil spring 172. Each push element is 176 (FIGS. 3 and 11-13) configured to fit in the interior of a cross member 80 and is held therein by a screw 178 (FIG. 11). The outer edge of each push element 176 is curved so as to function as a cam to push the respective protective cover 96 against the bias of the respective coil spring 172. In FIGS. 13-15, a sequence of positions of a protective cover 96 and a push element 176 are illustrated during a folding (collapsing) operation of the chair 22.

Alternatively, in another embodiment, a separate manually operated lever or other mechanism may be provided to move the cover. In this embodiment, the lever may be pivotally mounted to the frame and operate similar to the member 80 and push element 176 illustrated in FIGS. 8, 9 and 13-15.

Figure 5:
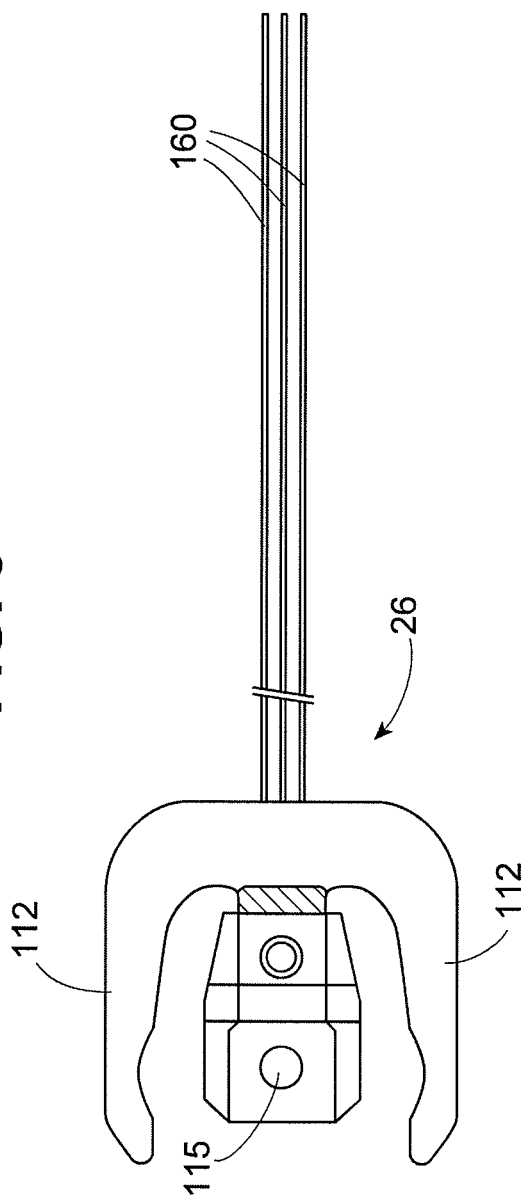
FIG. 5 is a plan view of the load sensor depicted in FIG. 4
Figure 6:
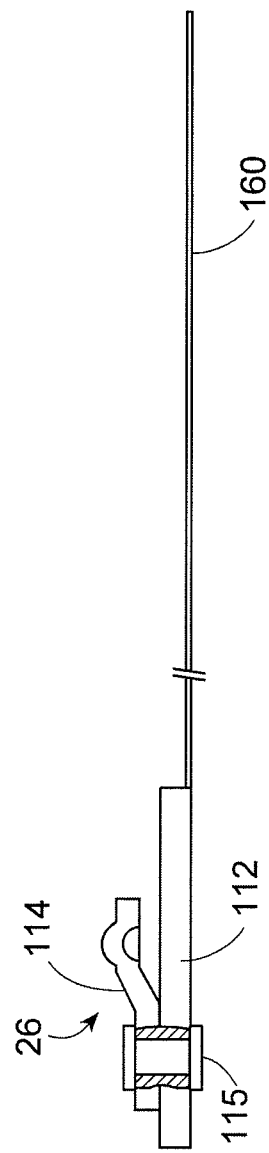
FIG. 6 is a side elevation view of the load sensor part depicted in FIG. 5.
Figure 10:
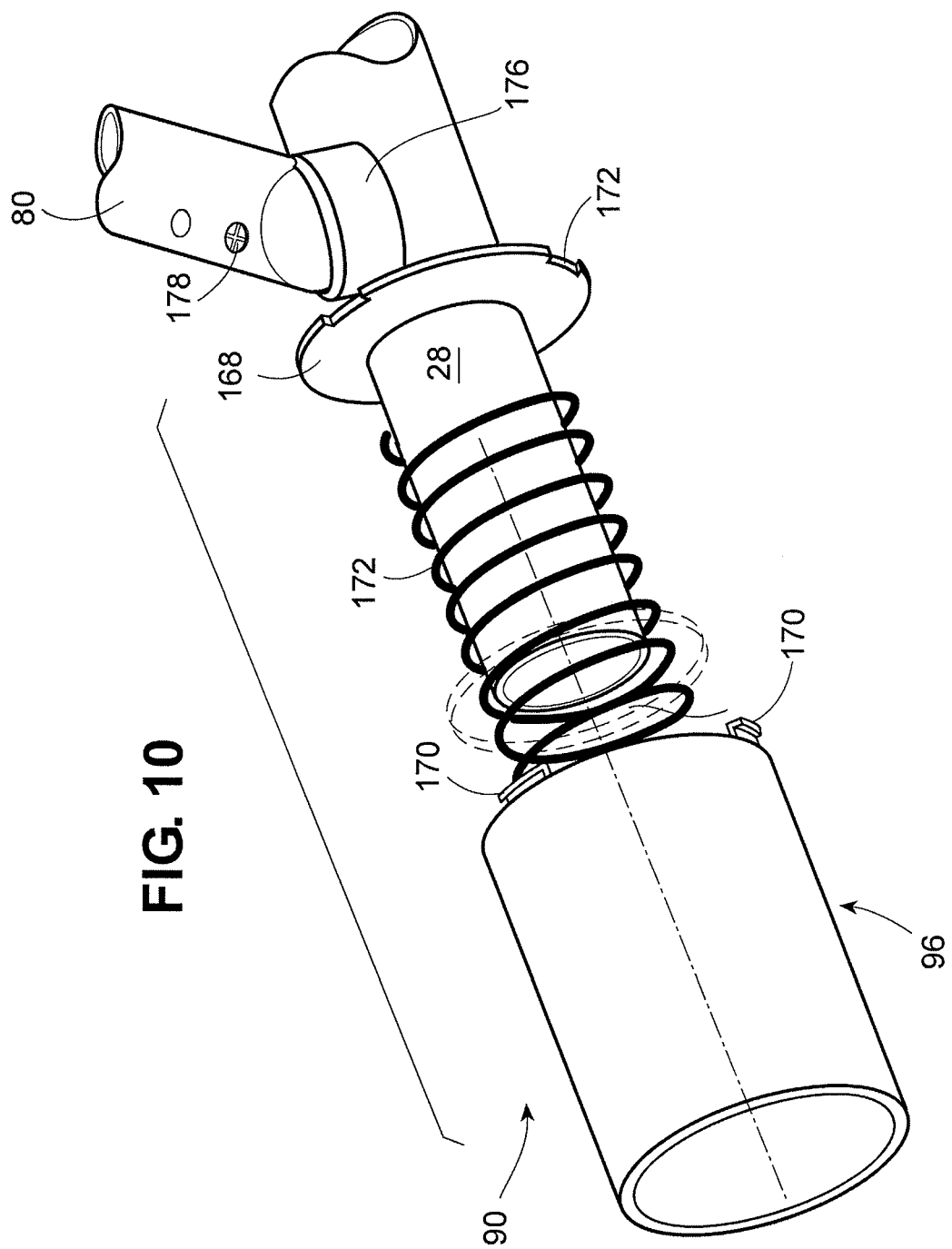
FIG. 10 is an exploded perspective view of the leg end depicted in FIG. 4 showing mounting of the protective cover.
Figure 16:
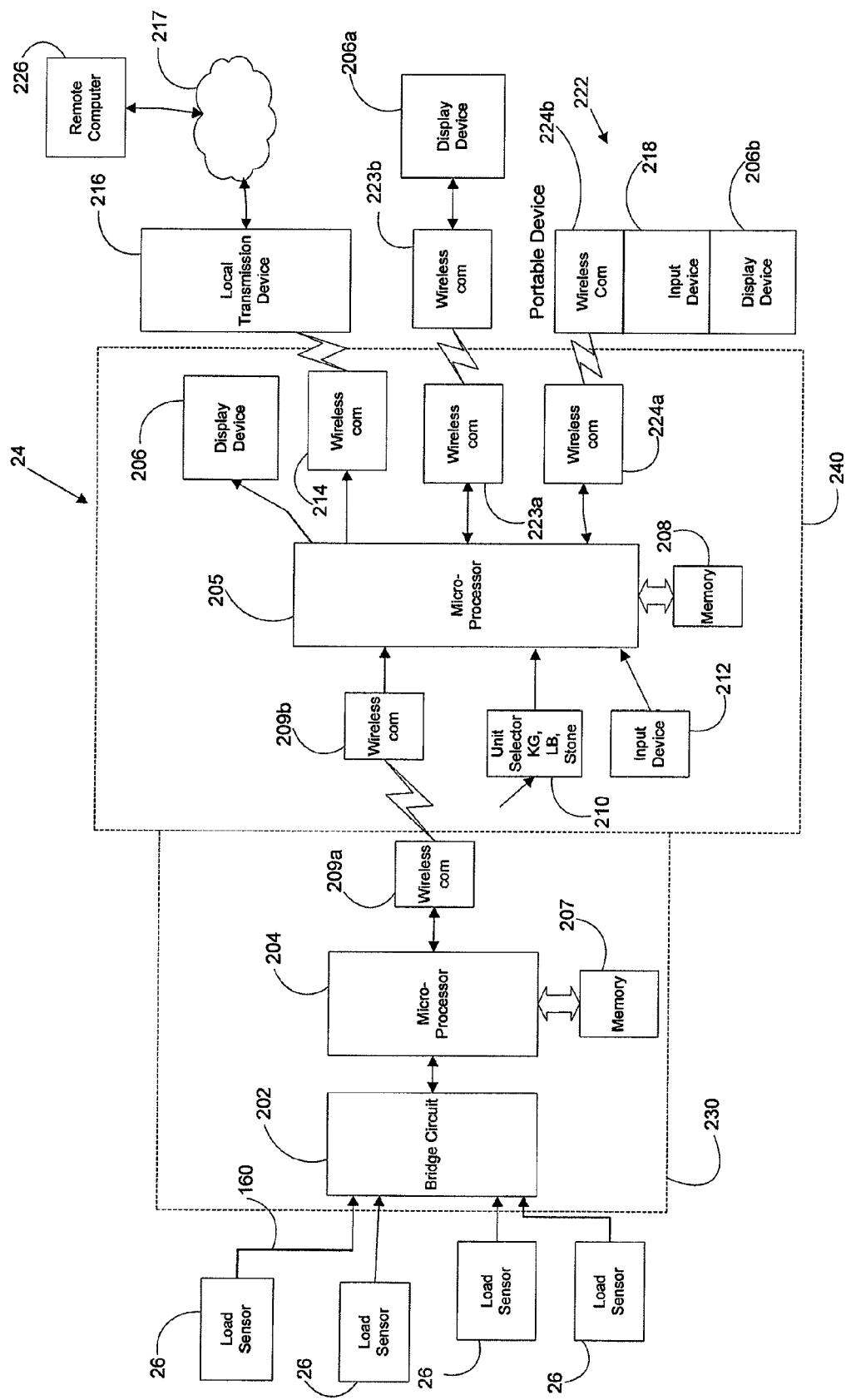
FIG. 16 is a block diagram of an electronic scale incorporated into the chair depicted in FIG. 1.

Referring to FIGS. 5-6 and 16, each sensor 26 is connected via wires 160 in an electrical bridge circuit 202 in conventional fashion. A person to be weighed is seated on the chair 22 with his or her feet on the foot rests 34. The load sensors 26 provide signals to the bridge circuit 202. The output of the bridge circuit 202 is proportional to the weight introduced onto the chair 22 after a paring or zeroing operation, all of which is well known in the scale arts.

According to various embodiments, the scale 20 includes processing and other circuitry for achieving various functions. In one embodiment, the scale is a stand-alone scale and includes processing circuitry and a display device for displaying weight, similar to a conventional electronic scale. In other embodiments, the scale provides weight data to a remote computer and either displays weight data locally or not. According to an embodiment in which the provides weight data to a remote computer, the scale may also provide other information to the remote computer, e.g., data, messages, queries, etc. entered into a local processing device, and may receive information from a remote computer, e.g., messages and other information.

In various embodiments, the scale 20 includes selected or all components of the electronic scale system 24 depicted in block form in FIG. 16. In one embodiment, output from the load sensors 26 (via wires 160 or in a wireless embodiment of a load sensor, wirelessly) is provided to bridge circuit 202, which provides a weight-related signal to a first microprocessor 204 (or other circuitry, e.g., hardwired or logic). Memory may be provided as part of microprocessor 204, or externally, e.g., as a memory device 207. In this embodiment, the microprocessor 204 processes the signals from the bridge circuit and provides a weight-related signal. For example, the bridge circuit 202 may provide analog signals to the microprocessor 204, which may output digital weight-related signals.

The weight-related signals output by microprocessor 204 may be provided for display or further processing. In one embodiment, the load sensors 26, the bridge circuit 202 and the first microprocessor 204 are coupled by conductors, e.g., are wired together. In this embodiment, a module 230 (FIGS. 16-19) attached, e.g., to a chair leg, comprises the bridge circuit and the first microprocessor, and wireless technology is provided to couple the first microprocessor 204 to further circuitry and/or a display device or devices, e.g., located in an upper part of the chair, and/or to a remote computer.

In one embodiment, the weight-related signals from the first microprocessor 204 are provided for further processing by a second microprocessor 205. Memory may be provided as part of microprocessor 205, or externally, e.g., as a memory device 208. The second microprocessor 205 may be located in a module 240 (FIGS. 16 and 17) attached, e.g., to the upper frame of the chair, either fixed thereto or removably as a portable unit. In this embodiment, the module 240 can be attached to the chair 22, e.g., to an arm rest or similar to display 206 in FIG. 1. In this embodiment, the electronic circuitry includes a first wireless communication device 209a and 209b, with device 209a being coupled to the first microprocessor 204 by a conductor, and device 209b being coupled to the second microprocessor 205 by a conductor. This arrangement eliminates the need to run wires from each leg of the chair to the module 240 located on the chair arm rest.

Display device 206 is shown in FIG. 16 to be part of module 240, but may be separate therefrom as depicted in FIG. 1. The display device 206 can be wired to the microprocessor 205 or wirelessly coupled thereto, e.g., by Bluetooth or radio frequency technology or any other suitable wireless technology (not shown). In alternative embodiments, system 24 may include less than all of the shown components, and may also include one or more of the components. Some of these variations are described herein.

In another embodiment, system 24 also includes a unit selector 210 which receives input to select the unit in which a weight value is to be displayed on the display device 206. In another embodiment, system 24 includes an input device 212 for user entry of data, messages, queries, etc. In a variation, the input device 212 may be used to select weight units.

In another embodiment, system 24 also includes at least one communications device 214 for communicating with a remote computer. According to this embodiment, weight data may be provided to a remote computer 226 via a network 217. In one embodiment, system 24 includes a local transmission device 216 which communicates with the remote computer 226 over network 217. The communications device 214 in one embodiment comprises a wireless device, e.g., a Bluetooth device, which communicates with a Bluetooth device in the local transmission device 216 which in turn communicates with the remote computer 226 over the network 217. In other embodiments, the transmission device 214 communicates with the network 217 without a local transmission device 216.

In another embodiment, the microprocessor 205 (or another processor) is configured to provide other information to and receive other information from the remote computer 226 over the network 217. For example, messages can be entered via input device 212 or another input device 218 (e.g., coupled to another device 222, which may portable, and is discussed below) for transmission to the remote computer 226 over the network 217, and the microprocessor 205 may provide for display on any or all of display devices 206, 206a and 206b of messages and information received from the remote compute 226 over the network 217.

In another embodiment, system 24 includes a second portable device 222 which includes a display device 206b. A communication device 224a, b couples the microprocessor 205 to the portable device 222. The communication device 224a,b may operate by Bluetooth technology or any other suitable wireless technology. In this embodiment, the microprocessor may provide information for display to either or both the display device 206 and the portable device 222. Such information may be generated and/or stored locally or received from the remote computer. In one embodiment, the microprocessor provides display device 206 only with local information, e.g., only weight information derived from the load sensors, and provides the portable device 222 with both local information and information provided by the remote computer 226. In this embodiment, an input device 218 and a microprocessor (not shown) are associated with portable device 222. Messages and information may be input via the input device 218, and information and data may be processed by the additional microprocessor for various purposes.

Any suitable microprocessors (e.g., Sonic SN 8P1919), bridge circuits, input devices, display devices, transmission devices, memory may be used for the components of system 24.

The following patent applications assigned to the assignee of this application disclose various features, systems, methods for obtaining health-related information locally and communicating with a remote computer in which the chair-based scale can be employed. e.g., as a sensing device: U.S. Pat. No. 6,840,904; Ser. Nos. 10/868,676; 10/963,205; 10/913,140; 11/108,355; 11/356,739; and 12/508,119.

Other embodiments of a scale comprise a chair with one or more wheels. In these embodiments, during a weight measurement, the wheel or wheels may be stowed so that the chair is supported by its legs, or sensors may be mounted so that they are loaded by a wheel or wheels.

Figure 18:
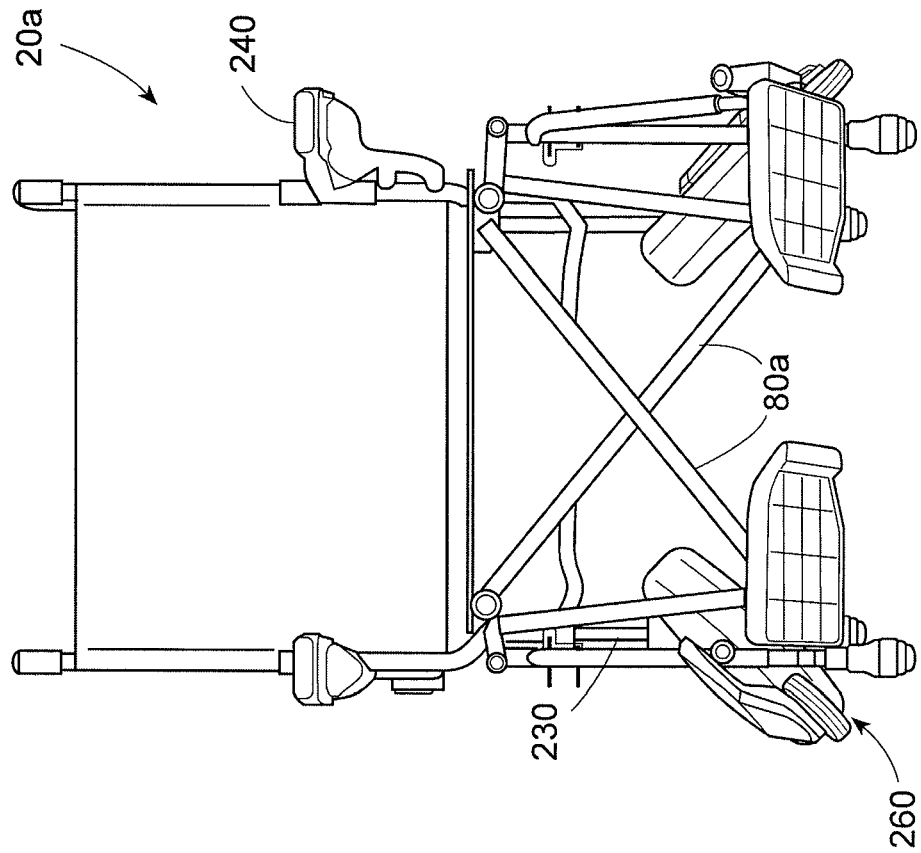
FIG. 18 is front elevation view of the chair depicted in FIG. 17 showing the chair in an erected, non-weighing configuration with the wheels in a fully stowed position.
Figure 17:
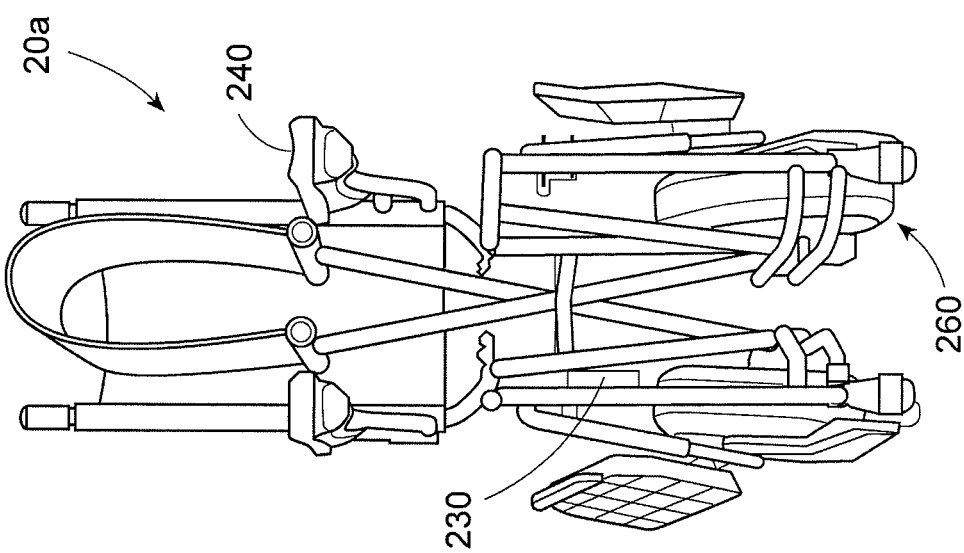
FIG. 17 is front elevation view of a chair-based weighing system according to another embodiment of the invention in which the chair includes wheels, the chair being shown in a collapsed, non-weighing configuration with the wheels in a partially stowed position.

In the embodiment illustrated in FIGS. 17-19, a chair 20a comprises wheels 268 and a stowable wheel system 260 for each wheel 268 (FIG. 19). The chair 20a depicted in FIGS. 17 and 18 is of the transport type, but has stowable wheels. The chair 20a includes two wheels attached to the rear legs, and in use is slightly pivoted rearwardly to roll. If desired four wheels and a stowable system for each may be used.

Each leg of the chair 20a includes a sensor assembly 90 the same as or similar to the sensor assembly 90 associated with the chair 20 depicted in the embodiment of FIGS. 1-15. Therefore, when the wheels 268 are stowed, in the weighing configuration of the chair 20a, the load transmitting member or plunger 27 (FIG. 19) projects from the leg and makes contact with the supporting surface, as described above for chair 20.

Referring to FIG. 19, a stowable system 260 comprises a lockable pivot joint 262 attached to a rear leg of the chair or to a cross member of the chair frame near a rear leg, and an arm 266 to which a wheel 268 is rotatably mounted.

FIG. 19 shows the chair in a non-weighing configuration thereof with the wheels 268 in fully stowed positions as shown in FIG. 19, i.e., the arm 266 is pivoted upwardly and in one embodiment also tilted inwardly to position the wheel 268 between a front and a rear leg resting on a chair cross member. The arrow on the arm 266 indicates that the arm is pivoted downwardly to position the wheel in its active position. The chair 20a is also of the folding type. FIG. 17 shows the chair in a folded configuration, non-weighing configuration in which the wheels 268 are partially stowed, i.e., pivoted upwardly but not tilted inwardly so that the chair can be folded more compactly. The sensor assembly 90 may include a cover 96 that is automatically projected and retracted in response to folding and unfolding of the chair, e.g., via cross members 80a, as described for chair 20.

The mechanisms for the components of the stowable system 260 may be conventional and therefore details thereof are not described herein.

In another embodiment, the wheels 268 are not stowable. In this embodiment, a wheel assembly comprises a spindle connected to an axle of the wheel which may be coupled to a load-transmitting member. The load-transmitting member may be coupled to a sensor in a sensor assembly similar to sensor assembly 90. In this embodiment, a protective cover may project and contact the wheel assembly to support the chair on the wheel assembly without loading the sensor. The cover may be refracted and projected by action of folding or unfolding a chair, as described above, or a separate manually operated lever or other mechanism may be provided to move the cover.

While the invention has been described and illustrated in connection with preferred embodiments, many variations and modifications as will be evident to those skilled in the art may be made without departing from the spirit and scope of the invention, and the invention is thus not limited to the precise details of methodology or construction set forth above as such variations and modifications are intended to be included within the scope of the invention.

What is claimed is:

1. A scale comprising:
    a chair that includes a plurality of legs and a seat, one or more of the legs being tubular;
    one or more load sensors and a mounting arrangement that attaches each load sensor to the chair in a fixed position, each load sensor being disposed entirely within one or more of the tubular legs such that each sensor directly or indirectly receives loading that would otherwise be received by one or more of the legs and transmits the received loading to one or more of the legs; and
    electronic circuitry that processes the signal or signals from the load sensor or sensors, or signals related thereto, and provides a signal related to the loading of the chair;
    wherein the scale comprises a weighing configuration and a non-weighing configuration, and wherein the mounting arrangement comprises a cover within which the load transmitting member is mounted, the cover having an extending non-weighing position in which the load transmitting member does not extend therefrom and the cover is adapted to contact the supporting surface and provide support for the leg of the chair to which it is attached, and a retracted weighing position in which the load transmitting member extends therefrom and is adapted to contact the supporting surface.

2. The scale of claim 1, wherein the mounting arrangement comprises a load transmitting member movably mounted to contact a supporting surface for the chair and the respective sensor and, responsive to loading on the chair, to move relative to the assembly and the respective sensor to transmit such loading to the respective sensor.

3. The scale of claim 1 comprising at least one foot rest attached to the chair so as to support feet of an occupant of the chair during a weighing operation.

4. The scale of claim 1, wherein the cover comprises a sleeve and the mounting arrangement mounts the sleeve in telescope fashion to the leg.

5. The scale of claim 1, wherein exactly one load sensor is disposed within each leg of the chair.

6. The scale of claim 1, comprising a collapsible chair.

7. The scale of claim 1, comprising a collapsible chair that includes for each sensor a pivotable member that pivots between first and second positions when the chair is collapsed and erected, respectively, each pivotable member being configured to contact a respective cover to move the respective cover between the projecting and retracted second positions thereof, in response to pivoting thereof between the first and second positions, respectively.

8. The scale of claim 7, comprising a spring biasing the cover to its projecting position, pivoting of a pivotable member overcoming the biasing to move the cover to the retracted position thereof.

9. The scale of claim 1, comprising a display device, wherein the electronic circuitry provides signals to the display device to cause the display device to display a weight value related to the signal related to the loading of the chair.

* * * * *